US012291695B2

(12) United States Patent
Corona, III et al.

(10) Patent No.: US 12,291,695 B2
(45) Date of Patent: May 6, 2025

(54) PARTICULATE LAUNDRY SOFTENING WASH ADDITIVE COMPRISING A QUAT AND EO/PO BLOCK COPOLYMER CARRIER

(71) Applicant: The Procter & Gamble Company, Cincinnati, OH (US)

(72) Inventors: Alessandro Corona, III, Wyoming, OH (US); Michael Paul Fontaine, Springboro, OH (US); Lenae Virginia Johnson, Cincinnati, OH (US); Rajan Keshav Panandiker, West Chester, OH (US); Charles L. Schmitt, Cincinnati, OH (US); Jaden Scott Zerhusen, Florence, KY (US)

(73) Assignee: The Procter & Gamble Company, Cincinnati, OH (US)

(*) Notice: Subject to any disclaimer, the term of this patent is extended or adjusted under 35 U.S.C. 154(b) by 155 days.

(21) Appl. No.: 18/204,539

(22) Filed: Jun. 1, 2023

(65) Prior Publication Data

US 2023/0303952 A1 Sep. 28, 2023

Related U.S. Application Data

(63) Continuation of application No. 17/519,877, filed on Nov. 5, 2021, now Pat. No. 11,708,545, which is a continuation of application No. 16/703,066, filed on Dec. 4, 2019, now Pat. No. 11,193,091.

(30) Foreign Application Priority Data

Dec. 4, 2018 (EP) .................................... 18210073

(51) Int. Cl.

| | |
|---|---|
| ***C11D 1/835*** | (2006.01) |
| ***C11D 1/62*** | (2006.01) |
| ***C11D 3/04*** | (2006.01) |
| ***C11D 3/20*** | (2006.01) |
| ***C11D 3/22*** | (2006.01) |
| ***C11D 3/37*** | (2006.01) |
| ***C11D 17/06*** | (2006.01) |

(52) U.S. Cl.

CPC .............. *C11D 3/3707* (2013.01); *C11D 1/62* (2013.01); *C11D 3/046* (2013.01); *C11D 3/2075* (2013.01); *C11D 3/225* (2013.01); *C11D 3/227* (2013.01); *C11D 17/06* (2013.01)

(58) Field of Classification Search

CPC .. C11D 17/06; C11D 1/62; C11D 1/72; C11D 11/0017; C11D 1/38; C11D 3/3707; C11D 3/3935; C11D 3/001; C11D 1/835; C11D 7/265

See application file for complete search history.

(56) References Cited

U.S. PATENT DOCUMENTS

| | | | | |
|---|---|---|---|---|
| 4,237,016 A | 12/1980 | Rudkin et al. | | |
| 6,492,322 B1 | 12/2002 | Cooper et al. | | |
| 7,871,976 B1 | 1/2011 | Aouad | | |
| 8,349,781 B2 | 1/2013 | Artiga-gonzalez | | |
| 8,476,219 B2 | 7/2013 | Aouad | | |
| 9,878,467 B2 | 1/2018 | Huddleston et al. | | |
| 10,240,111 B2 | 3/2019 | Bautista Cid | | |
| 10,301,579 B2 | 5/2019 | Dykstra | | |
| 10,377,966 B2 | 8/2019 | Zerhusen | | |
| 10,392,582 B2 | 8/2019 | Zerhusen | | |
| 10,471,629 B2 | 11/2019 | Huddleston | | |
| 10,487,293 B2 | 11/2019 | Zerhusen | | |
| 10,640,731 B2 | 5/2020 | Zerhusen | | |
| 10,648,115 B2 | 5/2020 | Zerhusen | | |
| 10,655,084 B2 | 5/2020 | Zerhusen | | |
| 11,118,135 B2 | 9/2021 | Zerhusen et al. | | |
| 11,193,091 B2 | 12/2021 | Corona, III et al. | | |
| 11,332,699 B2 | 5/2022 | Zerhusen et al. | | |
| 11,708,545 B2 | 7/2023 | Corona, III et al. | | |
| 2005/0020476 A1 | 1/2005 | Wahl | | |
| 2006/0217288 A1 | 9/2006 | Wahl | | |
| 2007/0054831 A1* | 3/2007 | Boardman | ............... | C11D 1/38 510/421 |
| 2008/0014393 A1 | 1/2008 | Denome et al. | | |
| 2008/0079993 A1 | 4/2008 | Kanamot | | |
| 2008/0242584 A1 | 10/2008 | Wahl | | |

(Continued)

FOREIGN PATENT DOCUMENTS

| | | |
|---|---|---|
| CN | 102099454 A | 6/2011 |
| CN | 107466317 A | 12/2017 |

(Continued)

OTHER PUBLICATIONS

"XP-002788248—Polyethyleneglycol 9000 (PEG 9000)", Retrieved from: https://www.srlchem.com/products/product_datasheet/productId/142433/Polyethyleneglycol-9000--PEG-9000, Retrieved on Jan. 22, 2019, 1 page.

"XP-002788249—Polyethylene Glycol 3350 ExiPlus", Retrieved from: https://www.srlchem.com/products/product_datasheet/productId/143688/Polyethylene-Glycol-3350-Exi-Plus, Retrieved on Jan. 22, 2019, 1 page.

"XP-002788270—Polyethyleneglycol 2000 for Synthesis", Retrieved from: https://www.merckmillipore.com/IN/en/product/Polyethylene-glycol-2000,MDA_CHEM-821037, Retrieved on Jan. 22, 2019, 3 pages.

"XP-002789158—Ester Quaternary for Fabric Softener", Retrieved from: https://www.scribd.com/document/392592125/SUNJIN-Surfactant-Catalogue-Fabric-Softener, Retrieved on Feb. 21, 2019, 4 pages.

(Continued)

*Primary Examiner* — Charles I Boyer

(74) *Attorney, Agent, or Firm* — Gary J. Foose; Carolyn S. Powell

(57) ABSTRACT

A composition including a plurality of particles, the plurality of particles including: about 25% to about 94% by weight a water soluble carrier; about 5% to about 45% by weight a quaternary ammonium compound; and about 0.5% to about 10% by weight a cationic polymer; wherein the plurality of particles comprises individual particles, each individual particle having a mass from about 1 mg to about 1 g.

19 Claims, No Drawings

(56) References Cited

U.S. PATENT DOCUMENTS

| | | | |
|---|---|---|---|
| 2009/0042766 A1 | 2/2009 | Mayer | |
| 2009/0137449 A1 | 5/2009 | Holderbaum | |
| 2012/0030882 A1 | 2/2012 | Wetrosky | |
| 2012/0324652 A1 | 12/2012 | Christensen et al. | |
| 2014/0179587 A1 | 6/2014 | Brown et al. | |
| 2016/0010032 A1* | 1/2016 | Tan | C11D 17/06 510/356 |
| 2016/0010033 A1 | 1/2016 | Tan | |
| 2016/0090551 A1* | 3/2016 | Fossum | C11D 1/22 510/327 |
| 2016/0122693 A1 | 5/2016 | Sodd | |
| 2016/0319226 A1* | 11/2016 | Lant | C11D 3/38636 |
| 2016/0369211 A1 | 12/2016 | Dykstra et al. | |
| 2017/0175059 A1 | 6/2017 | Depoot | |
| 2017/0342346 A1* | 11/2017 | Zhang | C08L 1/08 |
| 2017/0349865 A1 | 12/2017 | Zerhusen et al. | |
| 2018/0079993 A1* | 3/2018 | Zhang | C11D 3/3707 |
| 2018/0100124 A1 | 4/2018 | Piorkowski | |
| 2018/0265818 A1* | 9/2018 | Smets | C11D 3/3753 |
| 2018/0371378 A1 | 12/2018 | Danzer | |
| 2019/0055494 A1 | 2/2019 | Wetrosky | |
| 2019/0241840 A1 | 8/2019 | Burgess et al. | |
| 2020/0172834 A1 | 6/2020 | Corona, III et al. | |
| 2020/0224122 A1 | 7/2020 | Zerhusen | |
| 2020/0224123 A1 | 7/2020 | Zerhusen | |

FOREIGN PATENT DOCUMENTS

| | | | |
|---|---|---|---|
| CN | 108603147 | A | 9/2018 |
| CN | 111417706 | A | 7/2020 |
| EP | 0002085 | A3 | 6/1979 |
| EP | 0385529 | A2 | 9/1990 |
| EP | 0523287 | A1 | 1/1993 |
| EP | 1201741 | A1 | 5/2002 |
| EP | 1502942 | A1 | 2/2005 |
| EP | 2145944 | A1 | 1/2010 |
| EP | 3158038 | B1 | 3/2019 |
| JP | 2009532593 | A | 9/2009 |
| WO | 9323510 | A1 | 11/1993 |
| WO | 2008009521 | A1 | 1/2008 |
| WO | 2013036662 | A1 | 3/2013 |
| WO | 2016078941 | A1 | 5/2016 |
| WO | 2016078942 | A1 | 5/2016 |
| WO | 2016101980 | A1 | 6/2016 |
| WO | 2016102527 | A1 | 6/2016 |
| WO | 2016135217 | A1 | 9/2016 |
| WO | 2018055107 | A1 | 3/2018 |
| WO | 2018055121 | A1 | 3/2018 |
| WO | 2019108714 | A1 | 6/2019 |

OTHER PUBLICATIONS

PCT Search Report and Written Opinion for PCT/US2019/063942; dated Mar. 10, 2020, 14 pages.

Extended European Search Report and Search Opinion; Application No. 18210073.5; dated Jun. 26, 2019; 08 pages.

All Office Actions; U.S. Appl. No. 16/703,066, filed Dec. 4, 2019.

All Office Actions; U.S. Appl. No. 17/519,877, filed Nov. 5, 2021.

Corrigan, et al., "Dissolution Properties of Polyethylene Glycols and Polyethylene Glycol-Drug Systems", In International Journal of Pharmaceutics, vol. 4, Issue 1, Nov. 1, 1979, pp. 67-74.

* cited by examiner

PARTICULATE LAUNDRY SOFTENING WASH ADDITIVE COMPRISING A QUAT AND EO/PO BLOCK COPOLYMER CARRIER

FIELD OF THE INVENTION

Through the wash laundry softening additive.

BACKGROUND OF THE INVENTION

Consumers continually express interest is products that can simplify the processes they use to launder clothes, help them reduce the amount of time they spend dealing with dirty laundry, and help them achieve high levels of cleanliness and softness for their family's clothing. Cleaning and softening of laundry presently requires consumers to dose two products to either different compartments of the washing machine or to dose one product to the washing machine and one product to the dyer.

The process of laundering fabric can be broken up into three basic steps: washing, rinsing, and drying. The washing step typically employs water and detergent composition comprising anionic surfactant, along with other active agents that are compatible with anionic surfactants in the unused product form and in the wash liquor formed during the washing step. After washing, the laundry is rinsed one or more times as part of the rinsing step.

Presently, laundry softening is most often and practically accomplished during the rinsing step with a liquid softening composition that is separate from the detergent composition or during the drying step. To apply liquid softening composition to the laundry in the washing machine, the liquid softening composition is introduced to the laundry during the rinsing step. The liquid softening composition may be automatically introduced into the rinse from a compartment that keeps the liquid softening composition separate from the washing composition. The compartment may be part of the agitator, if present, or another part of the washing machine that can be opened to dispense the liquid softening composition into the drum. This is often referred to as softening through the rinse. Softening through the rinse requires the consumer to dose the detergent composition and the softening composition to different locations of the washing machine, which is inconvenient.

Laundry softening can also be accomplished during the drying step using fabric softening sheets. With either of these approaches to cleaning and softening, cleaning is performed separately from softening.

Consumers find it inconvenient to have to dispense multiple products to different locations, whether the locations are part of the washing machine or the locations are distributed between the washing machine and the dryer. What the consumer would like is to be able to dose the detergent composition and the softening composition to a single location.

Unfortunately, liquid detergent compositions tend to be incompatible with softening compositions. Liquid detergent compositions comprise anionic surfactants to help clean the clothing. Softening compositions typically comprise cationic surfactants to soften the clothing. When combined in a single package, the anionic surfactant and cationic surfactant can combine and form a solid precipitate. This results in problem with stability of the combination when packaged together in a liquid form or together in a wash liquor and a decrease in cleaning performance as compared to the detergent composition in absence of the softening composition. This incompatibility problem is among the reasons that detergent compositions and fabric softening compositions are dosed and applied separate from one another. Liquid fabric softening compositions packaged separately from detergent compositions may not be preferred by some consumers due to the inconvenience of dosing the composition to the washing machine, perceived messiness, and the texture of the product.

With these limitations in mind, there is a continuing unaddressed need for a solid form through the wash fabric softening composition that can be dispensed by the consumer together with the laundry detergent to providing softening through the wash during the washing step.

SUMMARY OF THE INVENTION

A composition comprising a plurality of particles, said plurality of particles comprising: about 25% to about 94% by weight a water soluble carrier, about 5% to about 45% by weight a quaternary ammonium compound; and about 0.5% to about 10% by weight a cationic polymer, wherein the plurality of particles comprises individual particles, each individual particle having a mass from about 1 mg to about 1 g; and wherein said water soluble carrier is selected from the group consisting of C8-C22 alkyl polyalkoxylate comprising more than about 40 alkoxylate units, ethoxylated nonionic surfactant having a degree of ethoxylation greater than about 30, EO/PO/EO block copolymer, PO/EO/PO block copolymer, EO/PO block copolymer, PO/EO block copolymer, and combinations thereof, wherein EO is a $—CH_2CH_2O—$ group and PO is a $—CH(CH_3)CH_2O—$ group.

DETAILED DESCRIPTION OF THE INVENTION

The composition described herein can provide for a through the wash fabric softening composition that is convenient for the consumer to dose to the washing machine. The through the wash fabric softening composition can be provided in a composition comprising a plurality of particles. The plurality of particles can be provided in a package that is separate from the package of detergent composition. Having the softening composition as a plurality of particles in a package separate from the package of detergent composition can be beneficial since it allows the consumer to select the amount of softening composition independent of the amount of detergent composition used. This can give the consumer the opportunity to customize the amount of softening composition used and thereby the amount of softening benefit they achieve, which is a highly valuable consumer benefit.

Particulate products, especially particulates that are not dusty, are preferred by many consumers. Particulate products can be easily dosed by consumers from a package directly into the washing machine or into a dosing compartment on the washing machine. Or the consumer can dose from the package into a dosing cup that optionally provides one or more dosing indicia and then dose the particulates into a dosing compartment on the washing machine or directly to the drum. For products in which a dosing cup is employed, particulate products tend to be less messy than liquid products.

The plurality of particles of the fabric softening composition can comprise a carrier, a quaternary ammonium compound, and cationic polymer. The carrier carries the quaternary ammonium compound and cationic polymer to the washing machine. The plurality of particles is dissolved into the wash liquor. The quaternary ammonium compound is deposited from the wash liquor onto the fibers of the fabric. And the cationic polymer is deposited onto the fibers of the fabric and promotes deposition of the quaternary ammonium compound onto the fabric. The cationic polymer and quaternary ammonium compound deposited on the fibers provides the consumer with a feeling of softness.

The plurality of particles can comprise about 25% to about 94% by weight a water soluble carrier. The plurality of particles can further comprise about 5% to about 45% by weight a quaternary ammonium compound, optionally the quaternary ammonium compound formed from a parent fatty acid compound having an Iodine Value from about 18 to about 60, optionally from about 20 to about 60. The plurality of particles can further comprise about 0.5% to about 10% by weight a cationic polymer. Individual particles can have a mass from about 1 mg to about 1 g. The individual particles can comprise clay. The plurality of particles can comprise about 0.1% to about 7% by weight clay. The clay can be bentonite.

The plurality of particles can have a ratio of percent by weight quaternary ammonium compound to percent by weight cationic polymer from about 3:1 to about 30:1, optionally from about 5:1 to about 15:1, optionally from about 5:1 to about 10:1, optionally about 8:1. Without being bound by theory, the mass fraction of quaternary ammonium compound and mass fraction of cationic polymer are balanced to achieve assistance from the cationic polymer to deposit satisfactory levels of deposition of the quaternary ammonium compound onto the fabric being treated.

The plurality of particles can comprise less than about 10% by weight water, optionally less than about 8% by weight water, optionally less than about 5% by weight water, optionally less than about 3% by weight water. Optionally, the plurality of particles can comprise from about 0% to about 10% by weight water, optionally from about 0% to about 8% by weight water, optionally from about 0% to about 5% by weight water, optionally from about 0% to about 3% by weight water. Decreasing or having these ranges of water content are thought to provide individual particles that are more stable. The lower the mass fraction of water, the more stable the individual particles are thought to be.

Water Soluble Carrier

The plurality of particles can comprise a water soluble carrier. The water soluble carrier acts to carry the fabric care benefit agents to the wash liquor. Upon dissolution of the carrier, the fabric care benefit agents are dispersed into the wash liquor.

The water soluble carrier can be a material that is soluble in a wash liquor within a short period of time, for instance less than about 10 minutes.

The water soluble carrier can be selected from the group consisting of C8-C22 alkyl polyalkoxylate comprising more than about 40 alkoxylate units, ethoxylated nonionic surfactant having a degree of ethoxylation greater than about 30, and combinations thereof.

The water soluble carrier can be a block copolymer having Formulae (I), (II), (III) or (IV), $$R^1O\text{-}(EO)x\text{—}(PO)y\text{-}R^2 \quad (I),$$

$$R^1O\text{—}(PO)x\text{-}(EO)y\text{-}R^2 \quad (II),$$

$$R^1O\text{-}(EO)o\text{-}(PO)p\text{-}(EO)q\text{-}R^2 \quad (III),$$

$$R^1O\text{—}(PO)o\text{-}(EO)p\text{-}(PO)q\text{-}R^2 \quad (IV),$$

or a combination thereof;

wherein EO is a —$CH_2CH_2O$— group, and PO is a —$CH(CH_3)CH_2O$— group;

$R^1$ and $R^2$ independently is H or a C1-C22 alkyl group;

x, y, o, p, and q independently is 1-100;

provided that the sum of x and y is greater than 35, and the sum of o, p and q is greater than 35; wherein the block copolymer has a weight average molecular weight ranging from about 3000 g/mol to about 15,000 g/mol.

The water soluble carrier can be a block copolymer or block copolymers, for example a block copolymer based on ethylene oxide and propylene oxide selected from the group consisting of PLURONIC-F38, PLURONIC-F68, PLURONIC-F77, PLURONIC-F87, PLURONIC-F88, and combinations thereof. PLURONIC materials are available from BASF.

Quaternary Ammonium Compound

The plurality of particles can comprise a quaternary ammonium compound so that the plurality of particles can provide a softening benefit to laundered fabrics through the wash, and in particular during the wash sub-cycle of a washer having wash and rinse sub-cycles. The quaternary ammonium compound (quat) can be an ester quaternary ammonium compound. Suitable quaternary ammonium compounds include but are not limited to, materials selected from the group consisting of ester quats, amide quats, imidazoline quats, alkyl quats, amidoester quats and combinations thereof. Suitable ester quats include but are not limited to, materials selected from the group consisting of monoester quats, diester quats, triester quats and combinations thereof.

The plurality of particles can comprise about 5% to about 45% by weight a quaternary ammonium compound. The quaternary ammonium compound can optionally have an Iodine Value from about 18 to about 60, optionally about 18 to about 56, optionally about 20 to about 60, optionally about 20 to about 56, optionally about 20 to about 42, and any whole numbers within the aforesaid ranges. Optionally, the plurality of particles can comprise about 10% to about 40% by weight a quaternary ammonium compound, further optionally having any of the aforesaid ranges of Iodine Value. Optionally, the plurality of particles can comprise about 20% to about 40% by weight a quaternary ammonium compound, further optionally having the aforesaid ranges of Iodine Value.

The quaternary ammonium compound can be selected from the group consisting of esters of bis-(2-hydroxypropyl)-dimethylammonium methylsulfate, isomers of esters of bis-(2-hydroxypropyl)-dimethylammonium methylsulfate and fatty acid, N,N-bis-(stearoyl-2-hydroxypropyl)-N,N-dimethylammonium methylsulfate, esters of bis-(2-hydroxypropyl)-dimethylammonium methylsulfate, isomers of esters of bis-(2-hydroxypropyl)-dimethylammonium methylsulfate, esters of N,N-bis(hydroxyethyl)-N,N-dimethyl ammonium chloride, N,N-bis(stearoyl-oxy-ethyl)-N,N-dimethyl ammonium chloride, esters of N,N,N-tri(2-hydroxyethyl)-N-methyl ammonium methylsulfate, N,N-bis-(palmitoyl-2-hydroxypropyl)-N,N-dimethylammoniu methylsulfate, N,N-bis-(stearoyl-2-hydroxypropyl)-N,N-dimethylammonium chloride, 1,2-di-(stearoyl-oxy)-3-trimethyl ammoniumpropane chloride, dicanoladimethylammonium chloride, di(hard)tallowdimethylammonium chloride, dicanoladimethylammonium methylsulfate, 1-methyl-1-stearoylamidoethyl-2-stearoylimidazolinium methylsulfate, imidazoline quat (no longer used by P&G): 1-tallowylamidoethyl-2-tallowylimidazoline, dipalmitoylmethyl hydroxyethylammonium methylsulfate, dipalmylmethyl hydroxyethylammoinum methylsulfate, 1,2-di(acyloxy)-3-trimethylammoniopropane chloride, and mixtures thereof.

A quaternary ammonium compound can comprise compounds of the formula:

$$\{R^2_{4-m}—N^+—[X—Y—R^1]_m\}A^- \quad (1)$$

wherein:

m is 1, 2 or 3 with proviso that the value of each m is identical;

each $R^1$ is independently hydrocarbyl, or substituted hydrocarbyl group;

each $R^2$ is independently a $C_1$-$C_3$ alkyl or hydroxyalkyl group, preferably $R^2$ is selected from methyl, ethyl, propyl, hydroxyethyl, 2-hydroxypropyl, 1-methyl-2-hydroxyethyl, poly($C_{2-3}$ alkoxy), polyethoxy, benzyl;

each X is independently $(CH_2)n$, $CH_2—CH(CH_3)—$ or $CH—(CH_3)—CH_2—$ and each n is independently 1, 2, 3 or 4, preferably each n is 2;

each Y is independently —O—(O)C— or —C(O)—O—;

A- is independently selected from the group consisting of chloride, methylsulfate, ethylsulfate, and sulfate, preferably A- is selected from the group consisting of chloride and methyl sulfate;

with the proviso that the sum of carbons in each $R^1$, when Y is —O—(O)C—, is from 13 to 21, preferably the sum of carbons in each $R^1$, when Y is —O—(O)C—, is from 13 to 19.

The quaternary ammonium compound can comprise compounds of the formula:

[R3N+CH2CH(YR1)(CH2YR1)]X— wherein each Y, R, R1, and X— have the same meanings as before. Such compounds include those having the formula:

[CH3]3N(+)[CH2CH(CH2O(O)CR1)O(O)CR1]C1(−) (2)

wherein each R is a methyl or ethyl group and preferably each R1 is in the range of C15 to C19. As used herein, when the diester is specified, it can include the monoester that is present.

An example of a preferred DEQA (2) is the "propyl" ester quaternary ammonium fabric softener active having the formula 1,2-di(acyloxy)-3-trimethylammoniopropane chloride. A third type of preferred fabric softening active has the formula:

(3)

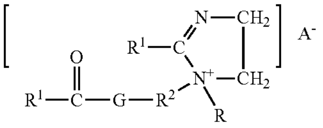

wherein each R, R1, and A- have the definitions given above; each R2 is a C1-6 alkylene group, preferably an ethylene group; and G is an oxygen atom or an —NR— group;

The quaternary ammonium compound can comprise compounds of the formula:

(4)

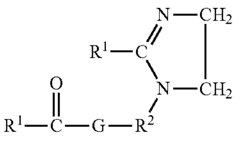

wherein R1, R2 and G are defined as above.

The quaternary ammonium compound can comprise compounds that are condensation reaction products of fatty acids with dialkylenetriamines in, e.g., a molecular ratio of about 2:1, said reaction products containing compounds of the formula:

R1-C(O)—NH—R2-NH—R3-NH—C(O)—R1 (5)

wherein R1, R2 are defined as above, and each R3 is a C1-6 alkylene group, optionally an ethylene group and wherein the reaction products may optionally be quaternized by the additional of an alkylating agent such as dimethyl sulfate.

The quaternary ammonium compound can comprise compounds of the formula:

[R1-C(O)—NR—R2-N(R)2-R3-NR—C(O)—R1]+ A− (6)

wherein R, R1, R2, R3 and A- are defined as above;

The quaternary ammonium compound can comprise compounds that are reaction products of fatty acid with hydroxyalkylalkylenediamines in a molecular ratio of about 2:1, said reaction products containing compounds of the formula:

R1-C(O)—NH—R2-N(R3OH)—C(O)—R1 (7)

wherein R1, R2 and R3 are defined as above;

A eighth type of preferred fabric softening active has the formula:

(8)

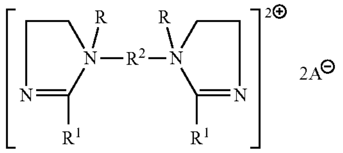

wherein R, R1, R2, and A- are defined as above.

Non-limiting examples of compound (1) are N,N-bis (stearoyl-oxy-ethyl) N,N-dimethyl ammonium chloride, N,N-bis(tallowoyl-oxy-ethyl) N,N-dimethyl ammonium chloride, N,N-bis(stearoyl-oxy-ethyl)N-(2 hydroxyethyl) N-methyl ammonium methylsulfate.

Non-limiting examples of compound (2) is 1,2 di (stearoyl-oxy) 3 trimethyl ammoniumpropane chloride.

A non-limiting example of Compound (3) is 1-methyl-1-stearoylamidoethyl-2-stearoylimidazolinium methylsulfate wherein R1 is an acyclic aliphatic C15-C17 hydrocarbon group, R2 is an ethylene group, G is a NH group, R5 is a methyl group and A- is a methyl sulfate anion, available commercially from the Witco Corporation under the trade name VARISOFT.

A non-limiting example of Compound (4) is 1-tallowylamidoethyl-2-tallowylimidazoline wherein R1 is an acyclic aliphatic C15-C17 hydrocarbon group, R2 is an ethylene group, and G is a NH group.

A non-limiting example of Compound (5) is the reaction products of fatty acids with diethylenetriamine in a molecular ratio of about 2:1, said reaction product mixture containing N,N"-dialkyldiethylenetriamine with the formula:

R1-C(O)—NH—CH2CH2-NH—CH2CH2-NH—C(O)—R1 wherein R1-C(O) is an alkyl group of a commercially available fatty acid derived from a vegetable or animal source, such as EMERSOL 223LL or EMERSOL 7021, available from Henkel Corporation, and R2 and R3 are divalent ethylene groups.

A non-limiting example of Compound (6) is a difatty amidoamine based softener having the formula:

[R1-C(O)—NH—CH2CH2-N(CH3)(CH2CH2OH)—CH2CH2-NH—C(O)—R1]+CH3SO4- wherein R1-C(O) is an alkyl group, available commercially from the Witco Corporation e.g. under the trade name VARISOFT.

An example of Compound (7) is the reaction products of fatty acids with N-2-hydroxyethylethylenediamine in a molecular ratio of about 2:1, said reaction product mixture containing a compound of the formula:

R1-C(O)—NH—CH2CH2-N(CH2CH2OH)—C(O)—R1 wherein R1-C(O) is an alkyl group of a commercially available fatty acid derived from a vegetable or animal source, such as EMERSOL 223LL or EMERSOL 7021, available from Henkel Corporation.

An example of Compound (8) is the diquaternary compound having the formula:

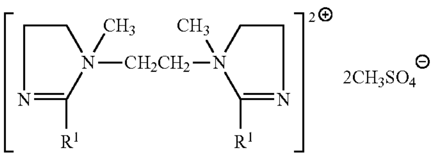

wherein R1 is derived from fatty acid, and the compound is available from Witco Company.

The quaternary ammonium compound can be di-(tallowoyloxyethl)-N,N-methylhydroxyethylammonium methyl sulfate.

It will be understood that combinations of quaternary ammonium compounds disclosed above are suitable for use in this invention.

In the cationic nitrogenous salts herein, the anion A-, which is any softener compatible anion, provides electrical neutrality. Most often, the anion used to provide electrical neutrality in these salts is from a strong acid, especially a halide, such as chloride, bromide, or iodide. However, other anions can be used, such as methylsulfate, ethylsulfate, acetate, formate, sulfate, carbonate, and the like. Chloride and methylsulfate can be the anion A. The anion can also carry a double charge in which case A- represents half a group.

The plurality of particles can comprise from about 10 to about 40% by weight quaternary compound.

The iodine value of a quaternary ammonium compound is the iodine value of the parent fatty acid from which the compound is formed, and is defined as the number of grams of iodine which react with 100 grams of parent fatty acid from which the compound is formed.

First, the quaternary ammonium compound is hydrolysed according to the following protocol: 25 g of quaternary ammonium compound is mixed with 50 mL of water and 0.3 mL of sodium hydroxide (50% activity). This mixture is boiled for at least an hour on a hotplate while avoiding that the mixture dries out. After an hour, the mixture is allowed to cool down and the pH is adjusted to neutral (pH between 6 and 8) with sulfuric acid 25% using pH strips or a calibrated pH electrode.

Next the fatty acid is extracted from the mixture via acidified liquid-liquid extraction with hexane or petroleum ether: the sample mixture is diluted with water/ethanol (1:1) to 160 mL in an extraction cylinder, 5 grams of sodium chloride, 0.3 mL of sulfuric acid (25% activity) and 50 mL of hexane are added. The cylinder is stoppered and shaken for at least 1 minute. Next, the cylinder is left to rest until 2 layers are formed. The top layer containing the fatty acid in hexane is transferred to another recipient. The hexane is then evaporated using a hotplate leaving behind the extracted fatty acid.

Next, the iodine value of the parent fatty acid from which the fabric softening active is formed is determined following ISO3961:2013. The method for calculating the iodine value of a parent fatty acid comprises dissolving a prescribed amount (from 0.1-3 g) into 15 mL of chloroform. The dissolved parent fatty acid is then reacted with 25 mL of iodine monochloride in acetic acid solution (0.1M). To this, 20 mL of 10% potassium iodide solution and 150 mL deionised water is added. After the addition of the halogen has taken place, the excess of iodine monochloride is determined by titration with sodium thiosulphate solution (0.1M) in the presence of a blue starch indicator powder. At the same time a blank is determined with the same quantity of reagents and under the same conditions. The difference between the volume of sodium thiosulphate used in the blank and that used in the reaction with the parent fatty acid enables the iodine value to be calculated.

The quaternary ammonium compound can be that used as part of BOUNCE dryer sheets available from The Procter & Gamble Company, Cincinnati, Ohio, USA. The quaternary ammonium compound can be the reaction product of triethanolamine and partially hydrogenated tallow fatty acids quaternized with dimethyl sulfate.

Cationic Polymer

The plurality of particles can comprise a cationic polymer. Cationic polymers can provide the benefit of a deposition aid that helps to deposit onto the fabric quaternary ammonium compound and possibly some other benefit agents that are contained in the particles.

The plurality of particles can comprise about 0.5% to about 10% by weight cationic polymer. Optionally, the plurality of particles can comprise about 0.5% to about 5% by weight cationic polymer, or even about 1% to about 5% by weight, or even about 2% to about 4% by weight cationic polymer, or even about 3% by weight cationic polymer. Without being bound by theory, it is thought that the cleaning performance of laundry detergent in the wash decreases with increasing levels of cationic polymer in the particles and acceptable cleaning performance of the detergent can be maintained within the aforesaid ranges.

The cationic polymer can have a cationic charge density more than about 0.05 meq/g (meq meaning milliequivalents), to 23 meq/g, preferably from about 0.1 meq/g to about 4 meq/g. even more preferably from about 0.1 meq/g to about 2 meq/g and most preferably from 0.1 meq/g to about 1 meq/g.

The above referenced cationic charge densities can be at the pH of intended use, which can be a pH from about 3 to about 9, optionally about 4 to about 9.

Cationic charge density of a polymer refers to the ratio of the number of positive charges on the polymer to the molecular weight of the polymer. Charge density is calculated by dividing the number of net charges per repeating unit by the molecular weight of the repeating unit. The positive charges may be located on the backbone of the polymers and/or the side chains of polymers. The average molecular weight of such suitable cationic polymers can generally be between about 10,000 and about 10 million, or even between about 50,000 and about 5 million, or even between about 100,000 and about 3 million.

Non-limiting examples of cationic polymers are cationic or amphoteric, polysaccharides, proteins and synthetic polymers. Cationic polysaccharides include cationic cellulose derivatives, cationic guar gum derivatives, chitosan and its derivatives and cationic starches. Cationic polysaccharides have a molecular weight from about 1,000 to about 2 million, preferably from about 100,000 to about 800,000. Suitable cationic polysaccharides include cationic cellulose ethers, particularly cationic hydroxyethylcellulose and cationic hydroxypropylcellulose. Particularly preferred are cationic cellulosic polymers with substituted anhydroglucose units that correspond to the general Structural Formula as follows:

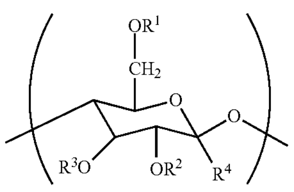

Wherein $R^1$, $R^2$, $R^3$ are each independently selected from H, $CH_3$, $C_{8-24}$ alkyl (linear or branched),

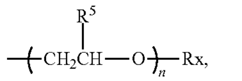

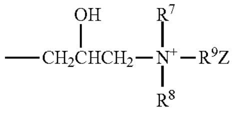

or mixtures thereof;

$R^4$ is H, n is from about 1 to about 10;

Rx is selected from the group consisting of H, $CH_3$, $C_{8-24}$ alkyl (linear or branched),

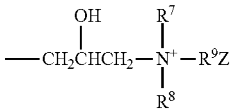

or mixtures thereof, wherein Z is a water soluble anion, preferably a chlorine ion and/or a bromine ion; $R^5$ is H, $CH_3$, $CH_2CH_3$, or mixtures thereof; $R^7$ is $CH_3$, $CH_2CH_3$, a phenyl group, a $C_{8-24}$ alkyl group (linear or branched), or mixture thereof; and $R^8$ and $R^9$ are each independently $CH_3$, $CH_2CH_3$, phenyl, or mixtures thereof:

With the provisio that at least one of $R^1$, $R^2$, $R^3$ groups per anhydroglucose unit is

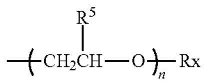

and each polymer has at least one

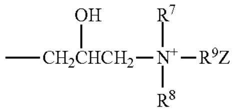

group.

The charge density of the cationic celluloses herein (as defined by the number of cationic charges per 100 anhydroglucose units) is preferably from about 0.5% to about 60%, more preferably from about 1% to about 20%, and most preferably from about 2% to about 10%.

Alkyl substitution on the anhydroglucose rings of the polymer ranges from about 0.01% to 5% per glucose unit, more preferably from about 0.05% to 2% per glucose unit, of the polymeric material.

The cationic cellulose may lightly cross-linked with a dialdehyde such as glyoxyl to prevent forming lumps, nodules or other agglomerations when added to water at ambient temperatures.

Examples of cationic hydroxyalkyl cellulose include those with the INCI name Polyquaternium 10 such as those sold under the trade names UCARE Polymer JR 30M, JR 400, JR 125, LR 400 and LK 400, Polymer PK polymers; Polyquaternium 67 such as those sold under the trade name SOFTCAT SK TM, all of which are marketed by Dow Chemicals, Midland MI, and Polyquaternium 4 such as those sold under the trade name CELQUAT H200 and CELQUAT L-200 available from National Starch and Chemical Company, Bridgewater, NJ. Other suitable polysaccharides include hydroxyethyl cellulose or hydoxypropylcellulose quaternized with glycidyl $C_{12}$-$C_{22}$ alkyl dimethyl ammonium chloride. Examples of such polysaccharides include the polymers with the INCI names Polyquaternium 24 such as those sold under the trade name QUATERNIUM LM 200 by Dow Chemicals of Midland, MI. Cationic starches refer to starch that has been chemically modified to provide the starch with a net positive charge in aqueous solution at pH 3. This chemical modification includes, but is not limited to, the addition of amino and/or ammonium group(s) into the starch molecules. Non-limiting examples of these ammonium groups may include substituents such as trimethylhydroxypropyl ammonium chloride, dimethylstearylhydroxypropyl ammonium chloride, or dimethyldodecylhydroxypropyl ammonium chloride. The source of starch before chemical modification can be chosen from a variety of sources including tubers, legumes, cereal, and grains. Non-limiting examples of this source of starch may include corn starch, wheat starch, rice starch, waxy corn starch, oat starch, cassaya starch, waxy barley, waxy rice starch, glutenous rice starch, sweet rice starch, amioca, potato starch, tapioca starch, oat starch, sago starch, sweet rice, or mixtures thereof. Nonlimiting examples of cationic starches include cationic maize starch, cationic tapioca, cationic potato starch, or mixtures thereof. The cationic starches may comprise amylase, amylopectin, or maltodextrin. The cationic starch may comprise one or more additional modifications. For example, these modifications may include cross-linking, stabilization reactions, phophorylations, hydrolyzations, cross-linking. Stabilization reactions may include alkylation and esterification. Suitable cationic starches for use in the present compositions are commercially-available from Cerestar under the trade name C*BOND and from National Starch and Chemical Company under the trade name CATO 2A. Cationic galactomannans include cationic guar gums or cationic locust bean gum. An example of a cationic guar gum is a quaternary ammonium derivative of hydroxypropyl guar such as those sold under the trade name JAGUAR C13 and Jaguar Excel available from Rhodia, Inc of Cranbury NJ and N-HANCE by Aqualon, Wilmington, DE Other suitable cationic polymers for use in the plurality of particles include polysaccharide polymers, cationic guar gum derivatives, quaternary nitrogen-containing cellulose ethers, synthetic polymers, copolymers of etherified cellulose, guar and starch. When used, the cationic polymers herein are either soluble in the composition used to form the particles or are soluble in a complex coacervate phase in the composition from which the particles are formed. Suitable cationic polymers are described in U.S. Pat. Nos. 3,962,418; 3,958,581; and U.S. Publication No. 2007/0207109A1.

One group of suitable cationic polymers includes those produced by polymerization of ethylenically unsaturated monomers using a suitable initiator or catalyst, such as those disclosed in WO 00/56849 and U.S. Pat. No. 6,642,200. Suitable cationic polymers may be selected from the group consisting synthetic polymers made by polymerizing one or more cationic monomers selected from the group consisting of N,N-dialkylaminoalkyl acrylate, N,N-dialkylaminoalkyl methacrylate, N,N-dialkylaminoalkyl acrylamide, N,N-dialkylaminoalkylmethacrylamide, quaternized N, N dialkylaminoalkyl acrylate quaternized N,N-dialkylaminoalkyl methacrylate, quaternized N,N-dialkylaminoalkyl acrylamide, quaternized N,N-dialkylaminoalkylmethacrylamide, Methacryloamidopropyl-pentamethyl-1,3-propylene-2-ol-ammonium dichloride, N,N,N,N',N',N",N"-heptamethyl-N"-3-(1-oxo-2-methyl-2-propenyl)aminopropyl-9-oxo-8-azo-decane-1,4,10-triammonium trichloride, vinylamine and its derivatives, allylamine and its derivatives, vinyl imidazole, quaternized vinyl imidazole and diallyl dialkyl ammonium chloride and combinations thereof, and optionally a second monomer selected from the group consisting of acrylamide, N,N-dialkyl acrylamide, methacrylamide, N,N-dialkylmethacrylamide, $C_1$-$C_{12}$ alkyl acrylate, $C_1$-$C_{12}$ hydroxyalkyl acrylate, polyalkylene glyol acrylate, $C_1$-$C_{12}$ alkyl methacrylate, $C_1$-$C_{12}$ hydroxyalkyl methacrylate, polyalkylene glycol methacrylate, vinyl acetate, vinyl alcohol, vinyl formamide, vinyl acetamide, vinyl alkyl ether, vinyl pyridine, vinyl pyrrolidone, vinyl imidazole, vinyl caprolactam, and derivatives, acrylic acid, methacrylic acid, maleic acid, vinyl sulfonic acid, styrene sulfonic acid, acrylamidopropylmethane sulfonic acid (AMPS) and their salts. The polymer may optionally be branched or cross-linked by using branching and crosslinking monomers. Branching and crosslinking monomers include ethylene glycoldiacrylate divinylbenzene, and butadiene. A suitable polyethyleneinine useful herein is that sold under the tradename LUPASOL by BASF, AG, Lugwigschaefen, Germany In another aspect, the cationic polymer may be selected from the group consisting of cationic polysaccharide, polyethylene imine and its derivatives, poly(acrylamide-co-diallyldimethylammonium chloride), poly(acrylamide-methacrylamidopropyltrimethyl ammonium chloride), poly (acrylamide-co-N,N-dimethyl aminoethyl acrylate) and its quaternized derivatives, poly(acrylamide-co-N,N-dimethyl aminoethyl methacrylate) and its quaternized derivative, poly(hydroxyethylacrylate-co-dimethyl aminoethyl methacrylate), poly(hydroxpropylacrylate-co-dimethyl aminoethyl methacrylate), poly(hydroxpropylacrylate-co-methacrylamidopropyltrimethylammonium chloride), poly (acrylamide-co-diallyldimethylammonium chloride-co-acrylic acid), poly(acrylamide-methacrylamidopropyltrimethyl ammonium chloride-co-acrylic acid), poly(diallyldimethyl ammonium chloride), poly(vinylpyrrolidone-co-dimethylaminoethyl methacrylate), poly(ethyl methacrylate-co-quaternized dimethylaminoethyl methacrylate), poly(ethyl methacrylate-co-oleyl methacrylate-co-diethylaminoethyl methacrylate), poly(diallyldimethylammonium chloride-co-acrylic acid), poly(vinyl pyrrolidone-co-quaternized vinyl imidazole) and poly (acrylamide-co-Methacryloamidopropyl-pentamethyl-1,3-propylene-2-ol-ammonium dichloride), Suitable cationic polymers include Polyquaternium-1, Polyquaternium-5, Polyquaternium-6, Polyquaternium-7, Polyquaternium-8, Polyquaternium-10, Polyquaternium-11, Polyquaternium-14, Polyquaternium-22, Polyquaternium-28, Polyquaternium-30, Polyquaternium-32 and Polyquaternium-33, as named under the International Nomenclature for Cosmetic Ingredients.

In another aspect, the cationic polymer may comprise polyethyleneimine or a polyethyleneimine derivative. In another aspect, the cationic polymer may comprise a cationic acrylic based polymer. In a further aspect, the cationic polymer may comprise a cationic polyacrylamide. In another aspect, the cationic polymer may comprise a polymer comprising polyacrylamide and polymethacrylamidoproply trimethylammonium cation. In another aspect, the cationic polymer may comprise poly(acrylamide-N-dimethyl aminoethyl acrylate) and its quaternized derivatives. In this aspect, the cationic polymer may be that sold under the tradename SEDIPUR, available from BTC Specialty Chemicals, a BASF Group, Florham Park, N.J. In a yet further aspect, the cationic polymer may comprise poly(acrylamide-co-methacrylamidopropyltrimethyl ammonium chloride). In another aspect, the cationic polymer may comprise a non-acrylamide based polymer, such as that sold under the tradename RHEOVIS CDE, available from Ciba Specialty Chemicals, a BASF group, Florham Park, N.J., or as disclosed in USPA 2006/0252668.

In another aspect, the cationic polymer may be selected from the group consisting of cationic polysaccharides. In one aspect, the cationic polymer may be selected from the group consisting of cationic cellulose ethers, cationic galactomanan, cationic guar gum, cationic starch, and combinations thereof Another group of suitable cationic polymers may include alkylamine-epichlorohydrin polymers which are reaction products of amines and oligoamines with epicholorohydrin, for example, those polymers listed in, for example, USPNs 6,642,200 and 6,551,986. Examples include dimethylamine-epichlorohydrin-ethylenediamine, available under the trade name CARTAFIX CB, CARTAFIX TSF, available from Clariant, Basle, Switzerland.

Another group of suitable synthetic cationic polymers may include polyamidoamine-epichlorohydrin (PAE) resins of polyalkylenepolyamine with polycarboxylic acid. The most common PAE resins are the condensation products of diethylenetriamine with adipic acid followed by a subsequent reaction with epichlorohydrin. They are available from Hercules Inc. of Wilmington DE under the trade name KYMENE from BASF AG (Ludwigshafen, Germany) under the trade name LURESIN.

The cationic polymers may contain charge neutralizing anions such that the overall polymer is neutral under ambient conditions. Non-limiting examples of suitable counter ions (in addition to anionic species generated during use) include chloride, bromide, sulfate, methylsulfate, sulfonate, methylsulfonate, carbonate, bicarbonate, formate, acetate, citrate, nitrate, and mixtures thereof.

The weight-average molecular weight of the cationic polymer may be from about 500 to about 5,000,000, or from about 1,000 to about 2,000,000, or from about 5000 to about 1,000,000 Daltons, as determined by size exclusion chromatography relative to polyethyleneoxide standards with RI detection. In one aspect, the weight-average molecular weight of the cationic polymer may be from about 100,000 to about 800,000 Daltons.

The cationic polymer can be provided in a powder form. The cationic polymer can be provided in an anhydrous state.

Fatty Acid

The plurality of particles can comprise fatty acid. The term "fatty acid" is used herein in the broadest sense to include unprotonated or protonated forms of a fatty acid. One skilled in the art will readily appreciate that the pH of an aqueous composition will dictate, in part, whether a fatty acid is protonated or unprotonated. The fatty acid may be in its unprotonated, or salt form, together with a counter ion, such as, but not limited to, calcium, magnesium, sodium, potassium, and the like. The term "free fatty acid" means a fatty acid that is not bound to another chemical moiety (covalently or otherwise).

The fatty acid may include those containing from 12 to 25, from 13 to 22, or even from 16 to 20, total carbon atoms, with the fatty moiety containing from 10 to 22, from 12 to 18, or even from 14 (mid-cut) to 18 carbon atoms.

The fatty acids may be derived from (1) an animal fat, and/or a partially hydrogenated animal fat, such as beef tallow, lard, etc.; (2) a vegetable oil, and/or a partially hydrogenated vegetable oil such as canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, etc.; (3) processed and/or bodied oils, such as linseed oil or tung oil via thermal, pressure, alkali-isomerization and catalytic treatments; (4) combinations thereof, to yield saturated (e.g. stearic acid), unsaturated (e.g. oleic acid), polyunsaturated (linoleic acid), branched (e.g. isostearic acid) or cyclic (e.g. saturated or unsaturated α-disubstituted cyclopentyl or cyclohexyl derivatives of polyunsaturated acids) fatty acids.

Mixtures of fatty acids from different fat sources can be used.

The cis/trans ratio for the unsaturated fatty acids may be important, with the cis/trans ratio (of the C18:1 material) being from at least 1:1, at least 3:1, from 4:1 or even from 9:1 or higher.

Branched fatty acids such as isostearic acid are also suitable since they may be more stable with respect to oxidation and the resulting degradation of color and odor quality.

The fatty acid may have an iodine value from 0 to 140, from 50 to 120 or even from 85 to 105.

The plurality of particles can comprise from about 1% to about 40% by weight fatty acid. The fatty acid can be selected from the group consisting of, a saturated fatty acids, unsaturated fatty acid, and mixtures thereof. The fatty acid can be a blend of saturated fatty acids, a blend of unsaturated fatty acids, and mixtures thereof. The fatty acid can be substituted or unsubstituted. The fatty acid can be provided with the quaternary ammonium compound. The fatty acid can have an Iodine Value of zero.

The fatty acid can be selected from the group consisting of stearic acid, palmitic acid, coconut oil, palm kernel oil, stearic acid palmitic acid blend, oleic acid, vegetable oil, partially hydrogenated vegetable oil, and mixtures thereof.

The fatty acid can be Stearic acid CAS No. 57-11-4. The fatty acid can be palmitic acid CAS No. 57-10-3. The fatty acid can be a blend of stearic acid and coconut oil.

The fatty acid can be C12 to C22 fatty acid. C12 to C22 fatty acid can have tallow or vegetable origin, can be saturated or unsaturated, can be substituted or unsubstituted.

Without being bound by theory, fatty acid may help as a processing aid for uniformly mixing the formulation components of the individual particles constituting the plurality of particles.

Particles

The individual particles constituting the plurality of particles can have individual mass from about 1 mg to about 1 g. The smaller the individual particles the faster they tend to dissolve in water. The individual particles constituting the plurality of particles can have an individual or mean particle mass of from about 1 mg to about 1000 mg, alternatively from about 5 mg to about 500 mg, alternatively from about 5 mg to about 200 mg, alternatively from about 10 mg to about 100 mg, alternatively from about 20 mg to about 50 mg, alternatively from about 35 mg to about 45 mg, alternatively about 38 mg. The individual particles constituting the plurality of particles can have standard deviation of mass of less than about 30 mg, alternatively less than about 15 mg, alternatively less than about 5 mg, alternatively about 3 mg.

The plurality of particles can be substantially free from individual particles having a mass less than 10 mg. This can be practical for limiting the ability of the particles to become airborne.

An individual particle may have a volume from about 0.003 $cm^3$ to about 5 $cm^3$, optionally from about 0.003 $cm^3$ to about 1 $cm^3$, optionally from about 0.003 $cm^3$ to about 0.5 $cm^3$, optionally from about 0.003 $cm^3$ to about 0.2 $cm^3$, optionally from about 0.003 $cm^3$ to about 0.15 $cm^3$. Smaller particles are thought to provide for better packing of the particles in a container and faster dissolution in the wash.

A plurality of particles may collectively comprise a dose for dosing to a laundry washing machine or laundry wash basin. A single dose of the plurality of particles may comprise from about 1 g to about 50 g of particles. A single dose of the plurality of particles may comprise from about 5 g to about 50 g, alternatively from about 10 g to about 45 g, alternatively from about 20 g to about 40 g, alternatively combinations thereof and any whole numbers of grams or ranges of whole numbers of grams within any of the aforementioned ranges. The plurality of particles can be made up of individual particles having different size, shape, and/or mass. The individual particles in a dose can each have a maximum dimension less than about 15 mm. Individual particles in a dose can have a maximum dimension less than about 1 cm.

The plurality of particles can comprise an antioxidant. The antioxidant can help to promote stability of the color and or odor of the particles over time between production and use. The plurality of particles can comprise from about 0.01% to about 1% by weight antioxidant, optionally from about 0.001% to about 2% by weight antioxidant, optionally from about 0.01% to about 0.1% by weight antioxidant. The antioxidant can be butylated hydroxytoluene.

The plurality of particles, or optionally individual particles constituting the plurality of particles, can comprise about 67% by weight water soluble carrier, about 24% by weight di-(tallowoyloxyethl)-N,N-methylhydroxyethylammonium methyl sulfate; about 6% by weight fatty acid; and about 3% by weight cationic polysaccharide that is polymeric quaternary ammonium salt of hydroxyethylcellulose which has been reacted with an epoxide substituted with a trimethylammonium group. The plurality of particles, or optionally individual particles constituting the plurality of particles, can comprise about 60% by weight water soluble carrier; about 24% by weight di-(tallowoyloxyethl)-N,N-methylhydroxyethylammonium methyl sulfate; about 6% by weight fatty acid; about 7% by weight unencapsulated perfume, and about 3% by weight cationic polysaccharide that is polymeric quaternary ammonium salt of hydroxyethylcellulose which has been reacted with an epoxide substituted with a trimethylammonium group.

The composition described herein can comprise a plurality of particles. The plurality of particles, or optionally individual particles constituting the plurality of particles, can comprise about 25% to about 94% by weight water soluble carrier, about 5% to about 45% by weight a quaternary ammonium compound; and about 0.5% to about 10% by weight a cationic polymer, wherein individual particles have a mass from about 1 mg to about 1 g; and wherein said composition has a viscosity from about 1 Pa-s to about 10 Pa-s at 65° C., from about 1 Pa-s to about 10 Pa-s at 65° C., optionally from about 1.5 to about 4, optionally from about 1 Pa-s to about 3 Pa-s, optionally about 2. Compositions such as this can be conveniently processed as a melt. Further, compositions such as this may be processed on a rotoformer and yield particles that are hemispherical, compressed hemispherical, or particles having at least one substantially flat or flat surface. Such particles may have relatively high surface area to mass as compared to spherical particles. The practicality of processing melts can at least partially depend on the viscosity of the melt.

For any of the compositions described herein, it can be desirable for the compositions to have a viscosity from about 1 Pa-s to about 10 Pa-s at 65° C., from about 1 Pa-s to about 5 Pa-s at 65° C., optionally from about 1.5 to about 4, optionally from about 1 Pa-s to about 3 Pa-s, optionally about 2. Such compositions may be conveniently processed on a rotoformer and yield particles that are hemispherical, compressed hemispherical, or particles having at least one substantially flat or flat surface.

The viscosity can be controlled, by way of nonlimiting example, by adding a diluent to the composition. The plurality of particles and or individual particles can comprise a diluent. The diluent can be selected from the group consisting of perfume, dipropylene glycol, fatty acid, and combinations thereof.

The plurality of particles can comprise individual particles that comprise at least one of the quaternary ammonium compound and the cationic polymer. The individual particles can comprise both the quaternary ammonium compound and the cationic polymer. The individual particles can be compositionally the same as one another. That is, the weight fraction of the same constituent materials in each of the particles are the same as one another. Such particles can practically be made in a batch or continuous process using a single composition of melt processable precursor material to form the individual particles.

Optionally, the individual particles can differ from one another in weight fraction of at least one of the quaternary ammonium compound and the cationic polymer. The individual particles can differ from one another in weight fraction of the quaternary ammonium compound and weight fraction of the cationic polymer. Providing particles that differ from one another in weight fraction of at least one of the quaternary ammonium compound and the cationic polymer can simplify the manufacturer's ability to provide multiple variants of the composition of the plurality of particles.

The manufacturer can form up the plurality of particles by blending different weight fractions of the individual particles to arrive at the desired levels of the quaternary ammonium compound and the cationic polymer in the plurality of particles. For example, the manufacture can make a first set of individual particles that comprise the water soluble carrier and the quaternary ammonium compound and be substantially free from or free from the cationic polymer or some weight fraction of the cationic polymer other than the weight fraction of the cationic polymer in the second set of particles. The manufacturer can also make a second set of individual particles the comprise the water soluble carrier and the cationic polymer and be substantially free from or free from the quaternary ammonium compound or some weight fraction of quaternary ammonium compound other than the weight fraction of the quaternary ammonium compound in the first set of particles.

The manufacturer can then blend chosen weight fractions of the sets of individual particles to make the plurality of particles having the desired weight fraction of water soluble carrier, quaternary ammonium compound, and cationic polymer, and optionally fatty acid. The manufacturer can assemble the plurality of particles with the desired weight fraction of quaternary ammonium compound to provide for the desired benefit for the composition of the plurality of particles. The desired weight fraction may be chosen on the basis of the level of softness desired, cost of the composition, typical wash conditions within a geography, different needs of different segments of a market, or other factors. This can reduce the number of formulas for which the manufacturer must maintain production expertise and control, the number of formulas the manufacturer must maintain and specify for certain production runs, and reduce the number of production disruptions to provide for variations in the composition of the plurality of particles.

Nonlimiting prophetic examples of compositions are in Table A.

TABLE A

Nonlimiting prophetic examples of compositions comprising a plurality of particles.

| Example 1 | First Set | Second Set | Plurality of Particles at 8:1 First Set: Second Set by Weight |
|---|---|---|---|
| Water Soluble Carrier (% by weight) | 67 | 67 | 67 |
| Quaternary Ammonium Compound (% by weight) | 27 | 0 | 24 |
| Cationic Polymer (% by weight) | 0 | 27 | 3 |
| Fatty Acid (% by weight) | 6 | 6 | 6 |

| Example 2 | First Set | Second Set | Plurality of Particles at 5:1 First Set: Second Set by Weight |
|---|---|---|---|
| Water Soluble Carrier (% by weight) | 70 | 75 | 70.83 |
| Quaternary Ammonium Compound (% by weight) | 29 | 10 | 25.83 |
| Cationic Polymer (% by weight) | 1 | 15 | 3.33 |

The weight fractions of individual constituents of the first set of particles and the second set of particles and the weight ratio at which the first set of particles and second set of particles are blended can be designed to provide the plurality of particles having the desired weight fractions of water soluble carrier, quaternary ammonium compound, cationic polymer, and optionally fatty acid, that can be used by the consumer to obtain a fabric softening benefit through the wash.

The plurality of particles can comprise at least two sets of individual particles, wherein a first set of the individual particles comprises the water soluble carrier and the quaternary ammonium compound and a second set of the individual particles comprises the water soluble carrier and the cationic polymer, wherein the cationic polymer is present in said second set of the individual particles at a greater weight fraction than in the first set of the individual particles. Similarly, the plurality of particles can comprise a first set of the individual particles and a second set of individual particles, wherein the first set of the individual particles comprises the water soluble carrier and the quaternary ammonium compound and the second set of the individual particles comprises the water soluble carrier and the cationic polymer, wherein the quaternary ammonium compound is present in the first set of said individual particles at a greater weight fraction than in the second set of said individual particles. Optionally, the plurality of particles can comprise a first set of said individual particles and a second set of said individual particles, wherein the first set of said individual particles comprises the water soluble carrier and the quaternary ammonium compound and are substantially free from said cationic polymer and the second set of the individual particles can comprise the water soluble carrier and the cationic polymer and are substantially free from the quaternary ammonium compound. These arrangements can simplify production of the sets of individual particles and blending of the sets of individual particles to form the plurality of particles that make up the composition. The manufacturer can set the weight fractions of the constituent materials to provide for quality manufacturing or to simplify production of each set of individual particles and to provide for convenient blending of sets of particles to form up pluralities of particles offering different levels of benefit across a range. The individual particles disclosed herein can be homogeneously structured particles or substantially homogeneously structured particles. A substantially homogenously structured individual particle is an individual particle in which the component materials forming the individual particle are substantially homogeneously mixed with one another. A substantially homogeneously structured individual particle need not be perfectly homogeneous. There may be variations in the degree of homogeneity that is within limits of mixing processes used by those skilled in the art in commercial applications to manufacture substantially homogeneously structured individual particles or homogeneously structured individual particles. The individual particles can have a continuous phase of carrier. Each of the individual particles can be a continuous phase of a mixture of the component materials forming the particle. So, for instance, if the individual particles comprise component materials A, B, and C, the individual particles can be a continuous phase of a mixture A, B, and C. The same can be said for any number of component materials forming the individual particles, by way of nonlimiting example, three, four, five, or more component materials.

A homogeneously structured individual particle is not a particle that has a core and coating, the particle being discrete from other particles having the same structure. A substantially homogeneously or homogeneously structured individual particle can be non-mechanically separable. That is, the component materials forming the homogeneously structured individual particle may not be mechanically separated, for instance by a knife or fine pick.

Homogeneously structured individual particles can be substantially free or free from inclusions having a size greater than about 500 µm. Homogeneously structured individual particles can be substantially free from or free from inclusions having a size greater than about 200 µm. Homogeneously structured individual particles can be substantially free from or free from inclusions having a size greater than about 100 µm. Without being bound by theory, an abundance of large inclusions may be undesirable because they might interfere with the dissolution of the particle in the wash or leave visually perceptible residue on the articles being washed.

In a substantially homogeneous individual particle, the constituent materials can be substantially randomly or randomly dispersed or the constituent materials can be substantially randomly or randomly dispersed in the carrier. Without being bound by theory, substantially homogeneous structured individual particles are thought to possibly be less capital intense to produce and the processes to produce such individual particles are thought to result in more uniform individual particles which are more acceptable to the consumer.

The individual particles disclosed herein, in any of the embodiments or combination disclosed, can have a shape selected from the group consisting of a sphere, hemisphere, oblate sphere, cylindrical, polyhedral, and oblate hemisphere. The individual particles disclosed herein can have ratio of maximum dimension to minimum dimension from about 10 to 1, optionally from about 8 to 1, optionally about 5 to 1, optionally about 3 to 1, optionally about 2 to 1. The individual particles disclosed herein can be shaped such that the individual particles are not flakes. Individual particles having a ratio of maximum dimension to minimum dimension greater than about 10 or that are flakes can tend to be fragile such the particles are prone to becoming dusty. The fragility of the particles tends to decrease with decreasing values of the ratio of maximum dimension to minimum dimension.

Process for Treating an Article of Clothing

The plurality of particles disclosed herein enable consumers to achieve softening through the wash, in particular the wash sub-cycle. By providing softening through the wash sub-cycle, consumers only need to dose the detergent composition and the particles to a single location, for example the wash basin, prior to or shortly after the start of the washing machine. This can be more convenient to consumers than using a liquid fabric enhancer that is separately dispensed into the wash basin after the wash sub-cycle is completed, for example prior to, during, or in between rinse cycles. For instance, it can be inconvenient for the consumer to manually dispense fabric softening composition after completion of the wash sub-cycle since the consumer must monitor progress of the sub-cycles of the washing machine, interrupt progress of the cycles of the washing machine, open the washing machine, and dispensing fabric softening composition into the wash basin. It can further be inconvenient to use auto-dispensing features of modern upright and high efficiency machines since that requires dispensing the fabric softening composition to a location other than where detergent composition is dispensed.

The process for treating an article of clothing can comprise the steps of providing an article of clothing in a washing machine. The article of clothing is contacted during the wash sub-cycle of the washing machine with a composition comprising a plurality of particles disclosed herein. The individual particles can dissolve into water provided as part of the wash sub-cycle to form a liquor. The dissolution of the individual particles can occur during the wash sub-cycle.

The plurality of particles can comprise the constituent components at the weight fractions described herein. For example, the plurality of particles can comprise about 25% to about 94% by weight a water soluble carrier. The plurality of particles can further comprise about 5% to about 45% by weight a quaternary ammonium compound. Optionally, the Iodine Value of the parent fatty acid from which the quaternary ammonium compound is formed can be from about 18 to about 60. The plurality of particles can further comprise about 0.5% to about 10% a cationic polymer. The individual particles can each have a mass from about 1 mg to about 1 g.

Washing machines have at least two basic sub-cycles within a cycle of operation: a wash sub-cycle and a rinse sub-cycle. The wash sub-cycle of a washing machine is the cycle on the washing machine that commences upon first filling or partially filing the wash basin with water. A main purpose of the wash sub-cycle is to remove and or loosen soil from the article of clothing and suspend that soil in the wash liquor. Typically, the wash liquor is drained at the end of the wash sub-cycle. The rinse sub-cycle of a washing machine occurs after the wash sub-cycle and has a main purpose of rinsing soil, and optionally some benefit agents provided to the wash sub-cycle from the article of clothing.

The process can optionally comprise a step of contacting the article of clothing during the wash sub-cycle with a detergent composition comprising an anionic surfactant. Most consumers provide a detergent composition to the wash basin during the wash sub-cycle. Detergent compositions can comprise anionic surfactant, and optionally other benefit agents including but not limited to perfume, bleach, brighteners, hueing dye, enzyme, and the like. During the wash sub-cycle, the benefit agents provided with the detergent composition are contacted with or applied to the article of clothing disposed in the wash basin. Typically, the benefit agents of detergent compositions are dispersed in a wash liquor of water and the benefit agents.

During the wash sub-cycle, the wash basin may be filled or at least partially filled with water. The individual particles can dissolve into the water to form a wash liquor comprising the components of the individual particles. Optionally, if a detergent composition is employed, the wash liquor can include the components of the detergent composition and the individual particles or dissolved individual particles. The plurality of particles can be placed in the wash basin of the washing machine before the article of clothing is placed in the wash basin of the washing machine. The plurality of particles can be placed in the wash basin of the washing machine after the article of clothing is placed in the wash basin of the washing machine. The plurality of particles can be placed in the wash basin prior to filling or partially filling the wash basin with water or after filling of the wash basin with water has commenced.

If a detergent composition is employed by the consumer in practicing the process of treating an article of clothing, the detergent composition and plurality of particles can be provided from separate packages. For instance, the detergent composition can be a liquid detergent composition provided from a bottle, sachet, water soluble pouch, dosing cup, dosing ball, or cartridge associated with the washing machine. The plurality of particles can be provided from a separate package, by way of non-limiting example, a carton, bottle, water soluble pouch, dosing cup, sachet, or the like. If the detergent composition is a solid form, such as a powder, water soluble fibrous substrate, water soluble sheet, water soluble film, water soluble film, water insoluble fibrous web carrying solid detergent composition, the plurality of particles can be provided with the solid form detergent composition. For instance, the plurality of particles can be provided from a container containing a mixture of the solid detergent composition and the plurality of particles. Optionally, the plurality of particles can be provided from a pouch formed of a detergent composition that is a water soluble fibrous substrate, water soluble sheet, water soluble film, water soluble film, water insoluble fibrous web carrying solid detergent composition.

Production of Individual Particles

For a carrier that can be processed conveniently as a melt, the rotoforming process can be used. A mixture of molten carrier and the other materials constituting the particles is prepared, for instance in a batch or continuous mixing process. The molten mixture can be pumped to a rotoformer, for instance a Sandvik ROTOFORM 3000. The molten mixture can be passed through the apertures in the rotating cylinder and deposited on a moving conveyor that is provided beneath the rotating cylinder. The molten mixture can be cooled on the moving conveyor to form individual solid particles. Once the individual particles are sufficiently coherent, the individual particles can be transferred from the conveyor to processing equipment downstream of the conveyor for further processing and or packaging. Optionally, the individual particles can be provided with inclusions of a gas. Such occlusions of gas, for example air, can help the particles dissolve more quickly in the wash. Occlusions of gas can be provided, by way of nonlimiting example, by injecting gas into the molten precursor material and milling the mixture. Individual particles can also be made using other approaches. For instance, granulation or press agglomeration can be appropriate.

Examples/Combinations

An example is below:

A. A composition comprising a plurality of particles, said plurality of particles comprising:
   about 25% to about 94% by weight a water soluble carrier,
   about 5% to about 45% by weight a quaternary ammonium compound; and
   about 0.5% to about 10% by weight a cationic polymer,
   wherein said plurality of particles comprises individual particles, each individual particle having a mass from about 1 mg to about 1 g; and
   wherein said water soluble carrier is selected from the group consisting of C8-C22 alkyl polyalkoxylate comprising more than about 40 alkoxylate units, ethoxylated nonionic surfactant having a degree of ethoxylation greater than about 30, EO/PO/EO block copolymer, PO/EO/PO block copolymer, EO/PO block copolymer, PO/EO block copolymer, and combinations thereof, wherein EO is a $—CH_2CH_2O—$ group and PO is a $—CH(CH_3)CH_2O—$ group.

B. The composition according to Paragraph A, wherein said water soluble carrier is selected from the group consisting of $R^1$O-(EO)x-(PO)y-$R^2$, $R^1$O—(PO)x-(EO)y-$R^2$, $R^1$O-(EO)o-(PO)p-(EO)q-$R^2$, $R^1$O—(PO)o-(EO)p-(PO)q-$R^2$, or a combination thereof, wherein $R^1$ and $R^2$ independently is H or a C1-C22 alkyl group;

x, y, o, p, and q independently is 1-100, the sum of x and y is greater than 35, and the sum of o, p and q is greater than 35; and wherein the block copolymer has a weight average molecular weight ranging from about 3000 to about 15,000.

C. The composition according to Paragraph A or B, wherein said quaternary ammonium compound is formed from a parent fatty acid compound having an Iodine Value from about 18 to about 60, optionally from about 20 to about 60, preferably from about 20 to about 56, more preferably from about 20 to about 42, more preferably from about 20 to about 35.

D. The composition according to any of Paragraphs A to C, wherein said quaternary ammonium compound is an ester quaternary ammonium compound.

E. The composition according to any of Paragraphs A to D, wherein said plurality of particles comprises about 10% to about 40% by weight said quaternary ammonium compound.

F. The composition according to any of Paragraphs A to E, wherein said plurality of particles comprises about 1% to about 5% by weight said cationic polymer.

G. The composition according to any of Paragraphs A to F, wherein said cationic polymer is a cationic polysaccharide.

H. The composition according to any of Paragraphs A to G, wherein said individual particles further comprise from about 1% to about 40% by weight fatty acid.

I. The composition according to any of Paragraphs A to H, wherein said quaternary ammonium compound is di-(tallowoyloxyethl)-N,N-methylhydroxyethylammonium methyl sulfate.

J. The composition according to any of Paragraphs A to I, wherein said cationic polymer is a cationic polysaccharide, wherein said cationic polysaccharide is polymeric quaternary ammonium salt of hydroxyethylcellulose which has been reacted with an epoxide substituted with a trimethylammonium group.

K. The composition according to any of Paragraphs A to J, wherein said individual particles are less than about 10% by weight water.

L. The composition according to any of Paragraphs A to K, wherein said plurality of particles further comprises a material selected from the group consisting of unencapsulated perfume, dipropylene glycol, fatty acid, and mixtures thereof.

M. The composition according to any of Paragraphs A to L, wherein said individual particles are substantially homogeneously or homogeneously structured individual particles.

N. The composition according to any of Paragraphs A to M, wherein said individual particles have a ratio of maximum dimension to minimum dimension from about 10 to 1.

O. The composition according to any of Paragraphs A to N, wherein said individual particles comprise said carrier, said quaternary ammonium compound, and said cationic polymer.

P. The composition according to Paragraph O, wherein said individual particles are compositionally the same as one another.

Q. The composition according to any of Paragraphs A to P, wherein said plurality of particles comprises at least two sets of said individual particles, wherein a first set of said individual particles comprises said water soluble carrier and said quaternary ammonium compound and a second set of said individual particles comprises said water soluble carrier and said cationic polymer, wherein said cationic polymer is present in said second set of said individual particles at a greater weight fraction than in said first set of said individual particles.

R. The composition according to any of Paragraphs A to P, wherein said plurality of particles comprises a first set of said individual particles and a second set of said individual particles, wherein said first set of said individual particles comprises said water soluble carrier and said quaternary ammonium compound and said second set of said individual particles comprises said water soluble carrier and said cationic polymer, wherein said quaternary ammonium compound is present in said first set of said individual particles at a greater weight fraction than in said second set of said individual particles.

S. The composition according to any of Paragraphs A to P, wherein said plurality of particles comprises a first set of said individual particles and a second set of said individual particles, wherein said first set of said individual particles comprises said water soluble carrier and said quaternary ammonium compound and are substantially free from said cationic polymer and said second set of said individual particles comprises said water soluble carrier and said cationic polymer and are substantially free from said quaternary ammonium compound.

T. A process for treating an article of clothing comprising the steps of:

providing an article of clothing in a washing machine; and contacting said article of clothing during a wash sub-cycle of said washing machine with the composition according to any of Paragraphs A to S.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for treating an article of clothing comprising the steps of:

providing an article of clothing in a washing machine; and contacting said article of clothing during a wash sub-cycle of said washing machine with a composition comprising a plurality of particles, said particles comprising:

25% to 94% by weight a water soluble carrier;

10% to 45% by weight a quaternary ammonium compound; and 0.5% to 10% by weight a cationic polymer;

wherein said plurality of particles comprises individual particles, each individual particle having a mass from 1 mg to 1 g; and wherein said water soluble carrier is selected from the group of EO/PO/EO block copolymer, PO/EO/PO block copolymer, EO/PO block copolymer, PO/EO block copolymer, and combinations thereof, wherein EO is a $—CH_2CH_2O—$ group and PO is a $—CH(CH_3)CH_2O—$ group.

2. The process according to claim 1, wherein the block copolymer has a weight average molecular weight ranging from 3000 to 15,000.

3. The process according to claim 1, wherein said quaternary ammonium compound is formed from a parent fatty acid compound having an Iodine Value from 18 to 60.

4. The process according to claim 1, wherein said quaternary ammonium compound is an ester quaternary ammonium compound.

5. The process according to claim 1, wherein said plurality of particles comprises 10% to 40% by weight said quaternary ammonium compound.

6. The process according to claim 1, wherein said plurality of particles comprises 1% to 5% by weight said cationic polymer.

7. The process according to claim 1, wherein said cationic polymer is a cationic polysaccharide.

8. The process according to claim 1, wherein said plurality of particles further comprises from 1% to 40% by weight fatty acid.

9. The process according to claim 1, wherein said quaternary ammonium compound is di-(tallowoyloxyethyl)-N, N-methylhydroxyethylammonium methyl sulfate.

10. The process according to claim 1, wherein said cationic polymer is a cationic polysaccharide, wherein said cationic polysaccharide is polymeric quaternary ammonium salt of hydroxyethylcellulose which has been reacted with an epoxide substituted with a trimethylammonium group.

11. The process according to claim 1, wherein said individual particles are less than 10% by weight water.

12. The process according to claim 1, wherein said individual particles are substantially homogeneously or homogeneously structured individual particles.

13. The process according to claim 1, wherein said individual particles comprise said carrier, said quaternary ammonium compound, and said cationic polymer.

14. The process according to claim 1, wherein said individual particles are compositionally the same as one another.

15. The process according to claim 1, wherein said quaternary ammonium compound is formed from a parent fatty acid compound having an Iodine Value from 20 to 60.

16. The process according to claim 15, wherein said quaternary ammonium compound is an ester quaternary ammonium compound.

17. The process according to claim 16, wherein said cationic polymer is a cationic polysaccharide.

18. The process according to claim 17, wherein said individual particles are substantially homogeneously or homogeneously structured individual particles.

19. The process according to claim 18, wherein the block copolymer has a weight average molecular weight ranging from 3000 to 15,000.

* * * * *